United States Patent Office 3,536,511
Patented Oct. 27, 1970

3,536,511
PREPARATION OF COATED IRON OXIDE PIGMENTS
Harry S. Greiner, Bethlehem, Pa., assignor to Chas. Pfizer & Co., Inc., New York, N.Y., a corporation of Delaware
No Drawing. Filed June 5, 1967, Ser. No. 643,368
Int. Cl. C09c 1/24, 3/00
U.S. Cl. 106—304
6 Claims

ABSTRACT OF THE DISCLOSURE

Method for manufacturing transparent iron oxide pigments by precipitating iron oxide pigment particles with an average particle size of 100 millimicrons or less, oxidizing the pigment particles and coating the pigment particles with hydrophobic aliphatic monocarboxylic acid, using morpholine to emulsify the acid in water. The excess water, and morpholine are removed by decantation, filtration, centrifugation, or similar physical methods, and finally drying the dewatered pigment. The coated pigment particles retain their transparency and resist agglomeration better than uncoated particles. Coating process applicable to opaque iron oxide pigments as well as to pigments which are not freshly precipitated.

BACKGROUND OF THE INVENTION

This invention relates to iron oxide pigment compositions and methods for preparing these pigments, and more particularly, it concerns a method for precipitating transparent iron oxide pigments and coating iron oxide pigments with hydrophobic aliphatic monocarboxylic acids.

Iron oxide pigments have been found to be difficult to disperse in the various commercial organic coating media. In addition, these pigments, which are often produced by precipitation as ferrous hydroxide, with subsequent oxidatioin and drying, tend to agglomerate soon after precipitation or upon moderate compacting before or after drying. The production of stable small particles of iron oxide pigment, for example, less than 100 millimicrons, is difficult due to the tendency of the small particles to agglomerate soon after precipitation or upon wet or dry storage.

Both the agglomerative tendency of the iron oxide pigment particles and the difficulty of dispersion of these pigment particles are effectively eliminated by coating the pigment particles with a dried layer of hydrophobic aliphatic monocarboxylic acid. These layers are usually monomolecular and are bonded to the surface of the pigment particles.

The coating process by which the layer of dried hydrophobic aliphatic monocarboxylic acid is caused to adhere to the surface of the pigment particle requires that the pigment particle be immersed in a substantially molecular dispersion of the acid under conditions which promote coating. These processes have, until now, been complex and expensive. A typical process required the separate steps of saponification of the acid, coating of the particle with a water solution of the saponified acid, acidulation of the coating to produce the free acid and drying of the coated particles. Another process for coating pigment particles requires the separate steps of dissolution of the acid in a solvent, coating the particles with the acid and solvent, and separation of the residual solvent from the coated particles by distillation.

The coating processes of this invention are less complex than the prior art processes and are consequently less expensive and more convenient.

The production of transparent iron oxide pigments requires a relatively small average pigment particle size, usually below 100 millimicrons, as well as relative uniformity of particle size. Prior art precipitation processes for transparent iron oxide pigments often do not provide the requisitely small particle size with sufficient uniformity of particle size. When the precipitation process of this invention is used, a uniformly sized transparent iron oxide pigment product is formed easily and in an economically advantageous manner. Where the precipitation and coating process of this invention are used together many of the problems inherent in the prior art processes for producing transparent iron particles which will not agglomerate are overcome.

A further disadvantage of certain of the prior art processes lies in the fact that their product is not a dry pigment but is, rather, a solvent-wet pigment slurry which is not stored or handled easily.

SUMMARY

The disadvantages of the known processes for manufacturing iron oxide pigment particles coated with hydrophobic aliphatic monocarboxylic acid are eliminated by the coating process of this invention. The new process uses morpholine to solubilize or emulsify the monocarboxylic acid in water solution and the water solution is used to coat the pigment particles with the monocarboxylic acid. Subsequent to coating, the magma of coated pigment floats on the surface of the remaining water solution and the excess water, morpholine and monocarboxylic acid may be removed by decantation from the lower portions of the vessel containing the mixture. The resultant coated pigment is then dried. The morpholine and water remaining in the coating are removed during the drying process. The preferred hydrophobic aliphatic monocarboxylic acid is coconut oil fatty acid.

The new coating process enables the coating of pigment particles with hydrophobic aliphatic monocarboxylic acid in a single vessel and consequently permits great simplification of the overall process. By eliminating the need for the acidulation steps, the use of the large amounts of solvents, and the use of complex separation procedures, the new process produces the coated pigment in dry form in a simplified manner which is economically advantageous.

The new precipitation process of this invention provides controlled reagent dilution levels, addition rates and oxidation steps, whereby the production of transparent iron oxide pigments with an average particle size of less than 100 millimicrons and with relatvely unformly sized particles is accomplished.

A transparent coated iron oxide pigment is produced in a simple manner when the new coating process is used together with the new precipitation process of this invention. In the absence of a coating, the small newly precipitated pigment particles would tend to agglomerate and form larger particles which would not manifest sufficient transparency in the final coating composition. The coating prevents this agglomerative tendency and, in addition, the coated particles can be stored in dry convenient form without agglomeration and, consequently, without loss of transparency.

The coating process is also useful with non-transparent pigments, as well, in order to prevent agglomeration of the pigment particles.

DETAILED DESCRIPTION OF THE INVENTION

The process of this invention is comprised of the steps of preparing a parent water-wet iron oxide pigment pulp, mixing and reacting the pigment pulp with at least one hydrophobic aliphatic monocarboxylic acid containing from 6 to 24 carbon atoms and morpholine dissolved in water; drying the coated particles by removing the excess water, acid and morpholine by heating the other physical methods.

The parent water-wet iron oxide pigment pulp may be prepared by many methods. It is preferable to produce the pulp from a pigment which has never been dried or to produce the pulp from freshly precipitated iron oxide. The parent water-wet pigment pulp may also be produced from dry iron oxide or from iron oxide which is wet but which is not freshly precipitated. Regardless of the initial raw material used to prepare the pigment pulp, the resultant pulp should consist of unagglomerated individual particles which are small enough to manifest the required transparency where the resultant coated pigment is to be a transparent one. Where a more opaque pigment is to be produced, the particle size in the initial pulp may be adjusted accordingly. The pigment particles contained in the water-wet pigment pulp should be well dispersed in the water so that agglomeration is prevented and so that each particle is coated with water. The subsequent coating of the particles with the monocarboxylic acid will be facilitated by the fact that each pigment particle is initially coated with water.

It is convenient to precipitated and oxidize the iron oxide which is to comprise the pulp in the same vessel which is used for the coating procedure although the use of a single vessel not essential.

When the iron oxide pigment which is to be coated is to be used as a transparent pigment, the pigment pulp must be produced under carefully controlled conditions. Precipitation and oxidation conditions such as the precipitataion temperature, the concentration of the reactants, the rate of introduction of the reactants and the rate and method of oxidation must be carefully controlled. Careful selection of conditions for precipitation of the pigment is necessitated by the fact that transparent iron oxide pigment must have an average particle size of less than 100 millimicrons and possess a relatively particle size. While the condition for precipitating iron oxide pigments of the required particle size may be varied widely it is preferred to use a narrower range of conditions with this invention.

Where the coating process of this invention is used to coat a transparent iron oxide pigment, it is preferable to produce the pigment in a controlled manner. The precipitation temperature may be varied from about 65° F. to about 120° F. and the precipitation time may be from one hour to eight hours. The preferred temperature is about 70° to 90° F. and the preferred reaction period is from five to seven hours. The initial concentration of reactants may range from 0.2 lb. per gallon of water of copperas or other ferrous salt to 0.6 lb. per gallon and the precipitation agent, which is generally an alkali metal hydroxide, may vary in initail concentrations from 0.6 lb. per gallon of water to 1.8 lbs. per gallon. It is also preferable to oxidize the ferrous precipitate to the ferric form by the use of air, although other methods, such as the use of dissolved salts as oxidizing agents, may be used effectively.

Although the process description given here and the examples which follow specifically describe the precipitation and coating of ferric oxide pigments the techniques described, in regard to the coating procedures, are equally applicable, with comparable effectiveness to the pigment pulps derived from coprecipitation of ferric oxide with hydrous oxides of ferrous iron, chromium, aluminum, manganese or nickel. In addition, both the acicular and rhombohedral forms of ferric oxide may be coated using the new process.

After precipitation and oxidation, the parent water-wet pulp may be separated from the mother liquors by allowing the precipitate to settle in the liquors after which the excess liquid is drawn off from the top of the precipitation vessel by decantation. The precipitates are washed with water until substantially all the residual salts are removed and until the pH of the wash water is close to 7.0.

The next step in the process is the addition of the hydrophobic aliphatic monocarboxylic acid to the water-wet pigment pulp. This pulp may be prepared using the precipitation methods outlined above or prepared from dried or separately precipitated pigments. A water solution of a suitable monocarboxylic acid is prepared using morpholine as a solubilizing agent. The amounts of morpholine and monocarboxylic acid to be added are partially determined by the amount of pigment to be coated. The amount of acid used should be at least 6%, by weight, of the dry $Fe_2O_3$ content of the parent pigment pulp and the amount of morpholine should be at least 0.6%, by weight, of the dry $Fe_2O_3$ content. Inasmuch as enough acid must be used to effectively coat all the pigment particles, the upper limit on the amount of acid used is artificial since the excess acid will not become part of the coating and will be discarded. Similar observations apply to the morpholine. It is preferable to use about 0.8% to 5%, by weight, of dry $Fe_2O_3$ in the parent pigment pulp, of morpholine and from 6% to 70%, by weight, of dry $Fe_2O_3$ in the parent pigment pulp, of monocarboxylic acid. The actual amounts of acid and morpholine used are determined by the nature of the particular acid used. Where coconut oil fatty acid is used as the monocarboxylic acid it is preferably present to the extent of 7% to 12%, by weight, of the final dry $Fe_2O_3$ content and the morpholine is preferably present to the extent of 0.8 to 2.0%, by weight of dry $Fe_2O_3$. The water solution of morpholine and monocarboxylic acid is added slowly to the ferric oxide pigment pulp while the pulp is agitated. The concentration of acid and morpholine in the water is not critical. Upon standing, the ferric oxide pigment, now coated with the hydrophobic monocarboxylic acid, will rise to the surface of the liquid and the residual liquids may be driven off at the bottom of the tank.

While lauric acid or coconut oil fatty acid are particularly preferred as the hydrophobic aliphatic monocarboxylic acids used for coating these ferric oxide pigments, other acids may be used. Individual aliphatic monocarboxylic acids, saturated or ethylenically usaturated, having from 6 to 24 carbon atoms per molecule or a mixture of these acids, may be used with this invention. Where one acid is substituted for another, the substitution should preferably be made on an equivalent molecular basis. Saturated aliphatic acids having from 8 to 18 carbon atoms per mole are preferable. Fatty acids useful individually or as mixtures include lauric, capric, caprylic, caproic, myristic, palmitic, stearic, carnaubic, behenic, margaric, pentadecanoic, tridecanoic, undecanoic, pelargonic, nondecanoic, arachidic, lignoceric, oleic, erucic, palmitoleic, linoleic, linolenic dehydrated castor oil acids, tall oil fatty acids, soya bean oil fatty acids and coconut oil fatty acids.

Morpholine is preferred as a solubilizing agent for these acids since it produces a superior particle coating and is released from the coating easily during the heating and drying steps.

After coating, most of the remaining water, morpholine and acid is removed from the coated pigment by filtration, centrifugation, decantation or similar physical methods. The dewatered pigment is then dried at a temperature from 70° to 170° F. and a preferred drying temperature range is 145° F. to 155° F. The remainder of the morpholine and water are removed in drying.

The dried, coated pigment may be stored in dry form without agglomeration or particle size buildup. Upon admixture with most organic coating composition vehicles, the coated pigment mixes easily and is dispersed without excessive expenditure of energy. Where the process is used to produce a transparent coated pigment, the average particle size of the pigment is less than 100 millimicrons and the range of particle sizes has been found to be 20 to 200 millimicrons. The coated iron oxide pigment particle, in this size range, will retain its transparency and will not tend to agglomerate.

The following examples are provided by way of illustration and should not be interpreted as limiting this invention, many variations of which are possible without departing from the spirit or scope thereof.

EXAMPLE I

A solution is prepared by dissolving 250 lbs. of copperas ($FeSO_4 \cdot 7H_2O$) in 800 gals. of water, with slow agitation. A second solution, prepared by dissolving 93 lbs. of sodium hydroxide in 54 gallons of water, was added slowly, with slow agitation, over a six hour period to the copperas solution while the copperas solution was recirculated by means of a pump. The temperature during the addition and consequent precipitation was about 70° F. Upon completion of the precipitation a high speed agitator was operated in the precipitation tank and air was blown through the solution at a high rate. By this means oxidation of the iron to the ferric condition was accomplished over a period of about one hour.

The contents of the tank were allowed to stand for about 24 hours while the solids settled to the bottom of the tank, and considerable clear liquid was drawn off at the top of the tank by decantation. The balance of the tank contents were washed through a Shriver Thickener, used as a washer, until the pH of the waters was about 7.0 and substantially all the salts were removed.

A third solution, which was prepared by dissolving 0.8 lb. of morpholine and about 8.0 lbs. of coconut oil fatty acid in about 15 gallons of water, was added slowly to the washed feric oxide pigment while the pigment was agitated. Upon standing, the ferric oxide pigment, coated with coconut oil fatty acid, rose to the top level of the liquid. Clear liquid was decanted off at the bottom of the vessel. The coated ferric oxide was filtered using a filter press and dried in an oven at 150° F. The average particle size of the pigment produced was less than 100 millimicrons.

When the foregoing procedure is repeated five times using, respectively, caprylic acid, lauric acid, oleic acid, behenic acid and steric acid in place of the coconut oil fatty acid, similar results are obtained each time.

EXAMPLE II

A solution is prepared by dissolving 311 lbs. of copperas ($FeSO_4 \cdot 7H_2O$) in 1000 gallons of water, with agitation. A second solution, prepared by dissolving 100.7 lbs. of ammonium hydroxide in 67 gallons of water, was added slowly with agitation, over a six hour period to the copperas solution while the copperas solution was agitated by means of a stirring mechanism. The temperature during the addition and consequent and consequent precipitation was about 70° F. Upon completion of the precipitation, a high speed agitator was operated in the precipitation tank and air was blown through the solution at a high rate. By this means, oxidation of the iron to the ferric condition was accomplished over a period of about one hour.

The contents of the tank were allowed to stand for about 24 hours while the solids settled in the bottom of the tank and considerable clear liquid was drawn off at the top of the tank by decantation. The balance of the tank contents were washed through a Shriver Thickener, used as a washer, until the pH of the wash waters was about 7.0 and substantialy all of the salts were removed.

A third solution, which was prepared by dissolving 2 lbs. of morpholine and 20 lbs. of stearic acid in about 15 gallons of water, was added slowly to the washed ferric oxide pigment while the pigment was agitated. Upon standing, the feric oxid pigment, coated with stearic acid, rose to the top level of the liquid. Clear liquid was decanted off at the bottom of the vessel. The coated ferirc oxide was filtered using a filter press and dried in an oven at about 150° F.

EXAMPLE III

When the procedure of Example I is followed, except that the pigment pulp to be coated is produced from previously precipitated pigment, similar results are obtained.

What is claimed is:

1. A method of coating an iron oxide pigment which consists essentially of the steps of (a) mixing a water-wet pigment pulp and a water solution of at least one hydrophobic aliphatic monocarboxylic acid and morpholine, said hydrophobic monocarboxylic acid having from 6 to 24 carbon atoms and being charged in the proportion of at least 0.06 part by weight of said acid per part by weight of $Fe_2O_3$ ash of said water-wet iron oxide pigment pulp and said morpholine being present in sufficient quantity to solubilize said hydrophobic aliphatic monocarboxylic acid in water solution, and (b) drying by heating the resultant coated iron oxide pigment.

2. The method of claim 1 wherein the hydrophobic aliphatic monocarboxylic acid is coconut oil fatty acid.

3. The method of claim 1 wherein the hydrophobic aliphatic monocarboxylic acid is lauric acid.

4. The method of claim 1 wherein the hydrophobic aliphatic monocarboxylic acid is stearic acid.

5. The method of claim 1 wherein the morpholine and hydrophobic aliphatic monocarboxylic acid in water solution are added in the proportions of at least 0.006 part by weight of morpholine per part by weight of $Fe_2O_3$ ash of said water-wet iron oxide pigment.

6. The method of claim 1 wherein step (b) is conducted at a temperature from 135° C. to 165° C.

References Cited
UNITED STATES PATENTS

| | | |
|---|---|---|
| 2,384,579 | 9/1945 | Vesce. |
| 2,479,836 | 8/1949 | Hoback et al. |
| 2,558,302 | 6/1951 | Marcot et al. _____ 106—304 |
| 2,917,400 | 12/1959 | Edwards. |
| 2,956,970 | 10/1960 | Godchalk _____ 106—304 XR |
| 3,052,644 | 9/1962 | Edwards _____ 106—304 XR |
| 3,413,135 | 11/1968 | Matson _____ 106—304 |

TOBIAS E. LEVOW, Primary Examiner

H. M. S. SNEED, Assistant Examiner

U.S. Cl. X.R.

106—288, 302, 308, 308